I. HAYMAN.
SPRING HUB.
APPLICATION FILED NOV. 20, 1916.
1,280,219.
Patented Oct. 1, 1918.
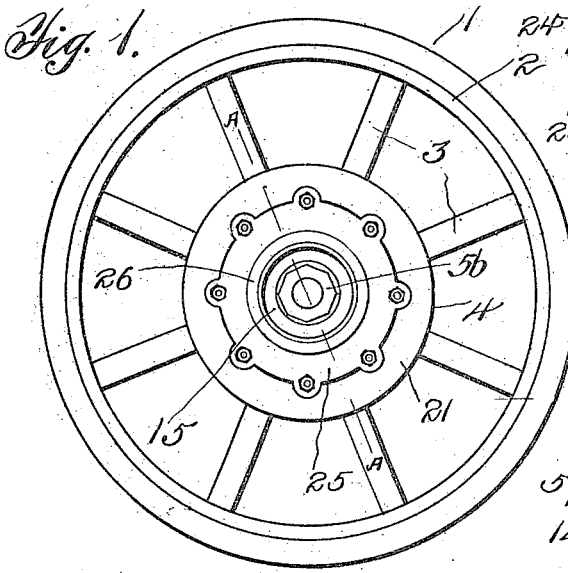
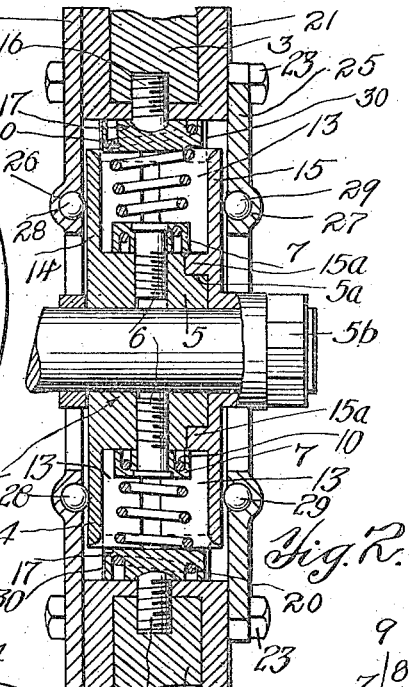
Inventor
Isaac Hayman

UNITED STATES PATENT OFFICE.

ISAAC HAYMAN, OF LOS ANGELES, CALIFORNIA.

SPRING-HUB.

1,280,219.

Specification of Letters Patent.

Patented Oct. 1, 1918.

Application filed November 20, 1916. Serial No. 132,472.

*To all whom it may concern:*

Be it known that I, ISAAC HAYMAN, a citizen of the United States, residing at Los Angeles, in the county of Los Angeles, State of California, have invented new and useful Improvements in Spring-Hubs, of which the following is a specification.

This invention relates to spring wheels or spring hubs; and relates particularly to certain improvements on and specific details of my spring hub for which Patent No. 1,187,989 was issued to me on June 20, 1916.

The things with which this application is particularly concerned are the spring mounting and control of the spring action between the two relatively moving parts of the spring hub, between what may be termed the fixed hub and the floating hub. Specific and preferred details of a particular form are explained in the following specification, reference being had to the accompanying drawings in which: Figure 1 is a side elevation of the improved wheel; Fig. 2 is an enlarged section taken as indicated by line A—A on Fig. 1; Fig. 3 is an enlarged longitudinal section showing the structure of the hub; Figs. 4 and 5 are elevations showing the means for holding and supporting the springs; and Fig. 6 is a plan of the spring holder shown in Fig. 4.

In the drawings the numeral 1 indicates the wheel, 2 the felly thereof, 3 the spokes, 4 a fixed hub, and 5 a floating hub, which is polygonal in shape and to each side of which a spring holding member 7 is affixed by means of bolt 6. Spring holder 7 has a circular spiral groove 8 therein, the bottom wall 9 of this groove conforming to the convolution 10 at the small end of the coiled spring 11. Secured to the outer hub by means of the screws 16 thereon, are spring holders 17 having circular spiral grooves 18, the bottom wall 19 of the groove corresponding to the large convolution 20 of the spring 11. The inner spring holder 7 is freely revoluble upon bolt 6; and revolution of the spring and spring holder will revolve the screw 16 and cause adjustment of the initial compression on the springs. These springs 16 engage directly into the spokes 3, so that stresses are transmittted directly between the springs and the spokes. It is to be noted that the spiral grooves 8 and 18 face away from the central or body portion of the spring, so that when the spring is in its holder it cannot be pulled out or unseated therefrom by any pulling movement. It will be noted that each of the holders also has an inclined seat face $8^a$ against which the next convolution of the spring seats when the end convolution is in the spiral groove.

The spokes may be mounted on hub 4 in any suitable manner, as being placed in annular channel 21, with spacing blocks 22 held by bolts 23. Bolts 23 connect and hold the fixed plates 24 and 25. Annular ball races 26 and 27 are provided on the inner faces of plates 24 and 25 and ball bearings 28 and 29 in said races bear against the side plates 14 and 15 of the inner hub 5. Plate 14 may be integral with hub 5 while plate 15 may be rotatably held on the hub 5 by having lugs $15^a$ which enter recesses $5^a$ in the side of the hub, the parts being held together by nut or hub cap $5^b$.

Guide walls 13 extend substantially radially and project inwardly from the plates 14 and 15, being located substantially as shown in Fig. 3. The outer hub 4 is provided with guides 30 between which the guide walls 13 are adapted to pass and be drivingly engaged. When there is a weight upon the hub 5, then that hub moves downwardly and those guide walls 13 which are lowermost move downwardly between the corresponding lowermost guides 30. As the wheel rotates, the guide walls 13 which are lowermost will always move down into the space between guides 30; and there will thus always be a positive driving connection between the inner and outer hubs, so as to take the rotational driving strain off the springs. With the parts in the position shown, when weight is placed upon the inner hub, then this weight will be supported by springs $d$, $e$ and $f$, while springs $a$, $b$ and $c$ will be somewhat extended; but they are prevented from moving off their seats by the special construction of those seats as herein described. Thus, with this construction, as described, the full resilient action of the springs is allowed, the springs are guided in their action, and a positive rotational driving connection is effected between the inner and outer hub so as to make the driving connection independent of the springs. The springs are held securely against breaking loose; but should any one break and work out of its holders it could not move about and interfere with the other springs because the springs are effectually separated by the guide walls 13. These walls also guide the springs in their action.

Having described a preferred form of my invention, I claim:

1. In a spring wheel, a fixed hub and a floating hub, radially resilient connection between the two hubs, and driving connection between the two hubs embodying a pair of opposite end flanges on one of the hubs, substantially radial lugs on said flanges projecting inwardly toward each other, and substantially radial projections on the other hub adapted to be engaged by the lugs, one of said end flanges with its radial lugs being removable from the hub and the other end flange.

2. In a spring wheel, an outer annular fixed hub and an inner floating hub, radially resilient connections between the two hubs, parallel flanges on opposite ends of the inner hub, inward substantially radial projections on the inner face of the outer hub between the two flanges, and substantially radial lugs projecting from the opposite inner faces of the flanges toward each other and adapted to engage the projections on the outer hub.

In witness that I claim the foregoing I have hereunto subscribed my name this 15th day of November, 1916.

ISAAC HAYMAN.

Witness:
ELWOOD H. BARKELEW.

Copies of this patent may be obtained for five cents each, by addressing the "Commissioner of Patents, Washington, D. C."